United States Patent [19]

Bose et al.

[11] Patent Number: 5,040,228
[45] Date of Patent: Aug. 13, 1991

[54] METHOD AND APPARATUS FOR AUTOMATICALLY FOCUSING AN IMAGE-ACQUISITION DEVICE

[75] Inventors: Chinmoy B. Bose, Green Brook, N.J.; Ilyoung Kim, Holland, Pa.

[73] Assignee: AT&T Bell Laboratories, Murray Hill, N.J.

[21] Appl. No.: 398,876

[22] Filed: Aug. 28, 1989

[51] Int. Cl.$^5$ .............................................. G06K 9/00
[52] U.S. Cl. .......................................... 382/8; 382/1; 358/227; 358/448; 358/458
[58] Field of Search ..................... 382/8, 1, 51, 52, 53; 358/227, 448, 458

[56] References Cited

U.S. PATENT DOCUMENTS

| | | | |
|---|---|---|---|
| 3,932,733 | 1/1976 | Olsen et al. | 358/227 |
| 4,601,057 | 7/1986 | Tsugi et al. | 382/51 |
| 4,700,225 | 10/1987 | Hara et al. | 358/106 |
| 4,814,889 | 3/1989 | Covey | 358/227 |
| 4,816,919 | 3/1989 | Coates | 358/227 |

OTHER PUBLICATIONS

Yoda et al., An Automatic Wafer Inspection System Using Pipelined Image Processing Techniques, Jan. 1988, 4–16.

Primary Examiner—Michael Razavi
Attorney, Agent, or Firm—Robert B. Levy

[57] ABSTRACT

Autofocusing of a lens (18) on a television camera (12) is achieved by first processing the image captured by the camera to establish a histogram of the intensity gradients for each of a plurality of small areas (pixels) in the captured image. From the histogram of the pixel intensity gradients, a focus index value, indicative of the sharpness of focus of the captured image, is established. The just-computed focus index value is then compared to the previously established value which is initially set to zero. The difference between the just- established and previously established focus index values establishes the direction in which the lens is incrementally stepped to more sharply focus the image. The steps of (a) capturing the image, (b) establishing the intensity gradient histogram, (c) comparing focus index value to the previously established value, and (d) incrementally stepping the lens are repeated as long as the just-established focus index values exceeds the previous value. Once the focus index value no longer exceeds the previously established value, the lens is stepped by an amount dependent on the just-established and previously established focus index values to sharply focus the image.

4 Claims, 5 Drawing Sheets

FIG. 4
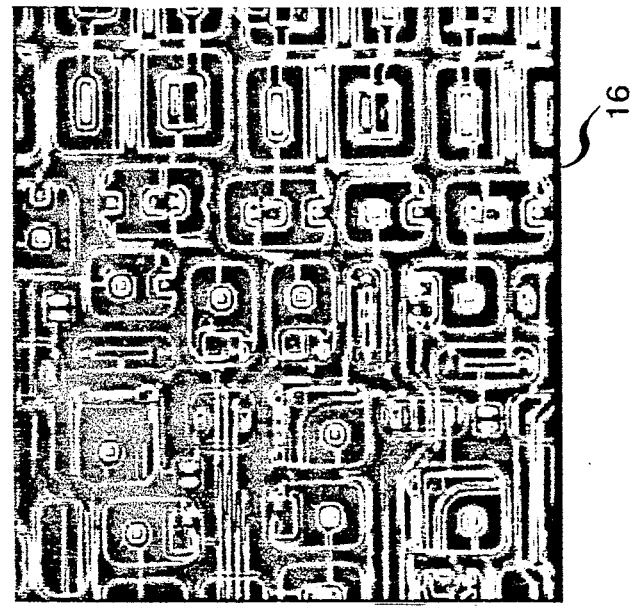
FIG. 4B
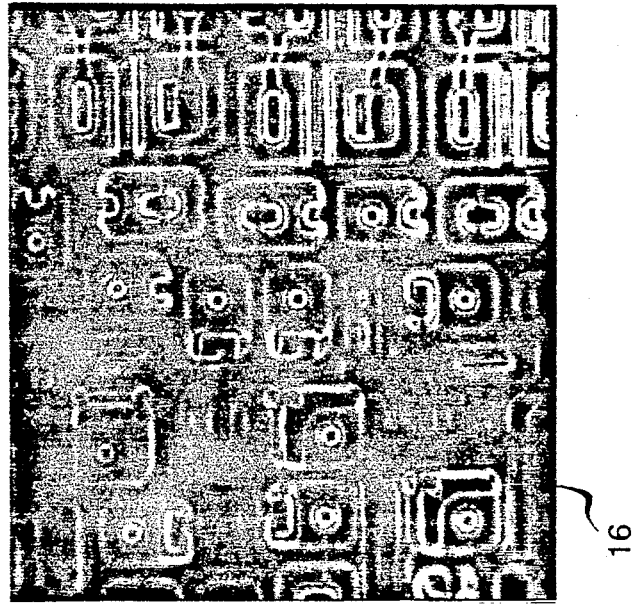
FIG. 4A

METHOD AND APPARATUS FOR AUTOMATICALLY FOCUSING AN IMAGE-ACQUISITION DEVICE

TECHNICAL FIELD

This invention relates to a method and apparatus for automatically focusing an image-acquisition device, such as a television camera, comprising part of a machine vision system.

BACKGROUND OF THE INVENTION

Machine vision systems are used widely in industry for accomplishing automated visual inspection of many different types of articles. A typical machine vision system comprises a television camera, which carries a lens or a similar optical system, and a machine vision processor, (e.g., a microprocessor) for processing the output signal of the camera. In practice, the vision processor is programmed to examine certain attributes of the image of the article captured by the camera in order to detect a defect, such as the presence or absence of a particular feature.

To achieve high accuracy with present day machine vision systems, it is important that the image of the article captured by the camera be in sharp focus. The more sharply focused the image of the article, the higher the degree of contrast and the greater the accuracy of inspection. For those applications where the articles undergoing inspection are all the same type, it is usually only necessary to manually adjust the focus of the camera at the outset of inspection, either by adjusting the lens or the spacing between the camera and the article, in order to assure that the image of each article is sharply focused. However, if different articles are being inspected by the same machine vision system, it is often necessary to adjust the focus of the camera each time an article different from the previous one is undergoing inspection. To avoid the need for an operator to manually adjust the camera focus, autofocusing systems have been developed.

Present day autofocusing systems typically include a motor which drives either a focusing element on the lens of the camera or which drives a platform carrying the article to adjust spacing of the article from the camera. The focusing motor is controlled by the machine vision processor in accordance with a focus index value, typically obtained by the summing the intensity gradients of each of a plurality of small areas (pixels) comprising the entire image of the article. This approach generally yields relatively poor sensitivity because the focus index value is dependent on the complete range of intensity gradients.

Rather than establish the focus index value by summing all the pixel intensity gradients, another technique may be used. Those of the intensity gradients which are above a threshold value can be summed to obtain a measure of the sharpness of focus. This approach requires an a priori knowledge of the intensity gradients within the captured image, which is not often possible.

Thus, there exists a need for an autofocusing technique which is not subject to the foregoing shortcomings.

SUMMARY OF THE INVENTION

Briefly, in accordance with the invention, a method is provided for autofocusing of an image-acquisition device (e.g., a television camera) so that the image captured by the device is in sharp focus. The method is performed by first capturing the image of an article with the image-acquisition device and then processing the image to determine the gradient of the intensity of each of a plurality of small areas (pixels) within the captured image. Thereafter, a histogram of the pixel intensity gradients is established. From the histogram, a focus index value, determinative of the sharpness of focus of the captured image is derived. The just-established focus index value is compared to the previously established focus index value (initially set to zero), and the difference between them is employed to determine in which direction the focus should be incrementally adjusted or stepped, by adjusting the lens on the image-acquisition device, or the spacing of the image-acquisition device from the article, to more sharply focus the image of the article. The focus of the image-acquisition devices is then incrementally stepped in the direction determined to achieve a sharper focus. The process described above is repeated until the just-established focus index value no longer exceeds the value determined previously. Once this occurs, the step size required to step the focus to bring the image into the sharpest focus possible is computed, and the focus of the image-acquisition device is stepped accordingly in the opposite direction as before to bring the captured image into sharp focus.

BRIEF DESCRIPTION OF THE DRAWINGS

FIGS. 4A and 4B are photographic representations of the gradient image obtained by substituting the intensity gradient for the actual intensity values for each of the small areas (pixels) in the images of FIGS. 3A and 3B, respectively;

DETAILED DESCRIPTION

Figure 1:
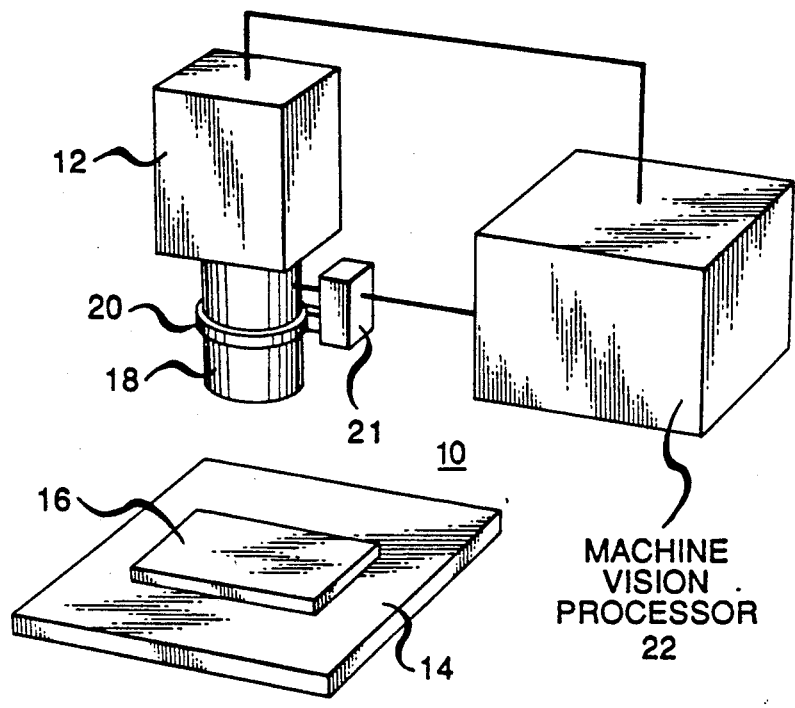
FIG. 1 is a block schematic diagram of an apparatus for carrying out the method of the present invention.

FIG. 1 illustrates a machine vision system 10 on which the autofocusing technique of the present invention is practiced. The vision system 10 comprises an image-acquisition device 12, typically, a television camera, which is trained on a platform 14 on which an article 16 is placed. The camera 12 is provided with a set of optics 18, in the form of a lens provided with rotatable focusing ring 20 about its exterior for adjusting the focus of the image captured by the camera. The focusing ring 20 about the lens 18 is in meshing engagement with, so as to be driven by, an electric motor 21 carried by the lens. Rotation of the focusing ring 20 by the motor 21 serves to control the focusing of the camera 12. Alternatively, focusing of the camera 12 could be controlled by driving the camera 12 or the platform 14, relative to each other, along the camera's optical axis (not shown). In the illustrated example, the article 16 takes the form of a semiconductor chip whose size has been greatly exaggerated for purposes of illustration. Typically, the chip 16 is illuminated by a bright field illumination, using a beam splitter (not shown) to direct light onto the chip coaxial with the optical axis of the camera 12.

The machine vision system 10 also includes a machine vision processor 22 for processing the output signal of the camera 12 to detect certain attributes in the image captured by the camera. For example, the vision processor 22 may be programmed to inspect the chip 16 for defects such as scratches and stains in the manner taught in U.S. patent application Ser. No. 259,640, filed on Oct. 18, 1988, in the name of C. B. Bose et al., and assigned to AT&T. In the illustrated example, the vision processor 22 takes the form of a model P256 vision processor, manufactured by IRI Corporation, Carlsbad, Calif.

In order for the vision processor 22 to accurately detect the scratches and stains on the surface of the chip 16, or any other such attributes, the image of the chip captured by the television camera 12 should be sharply focused. To assure that the image captured by the camera 12 is sharply focused, the motor 21, which drives the focusing ring 20 on the lens 18, is controlled by the vision processor 22 pursuant to a unique autofocusing technique, developed in accordance with the invention. The details of the autofocusing technique are illustrated in flowchart form in FIG. 2.

Figure 2:
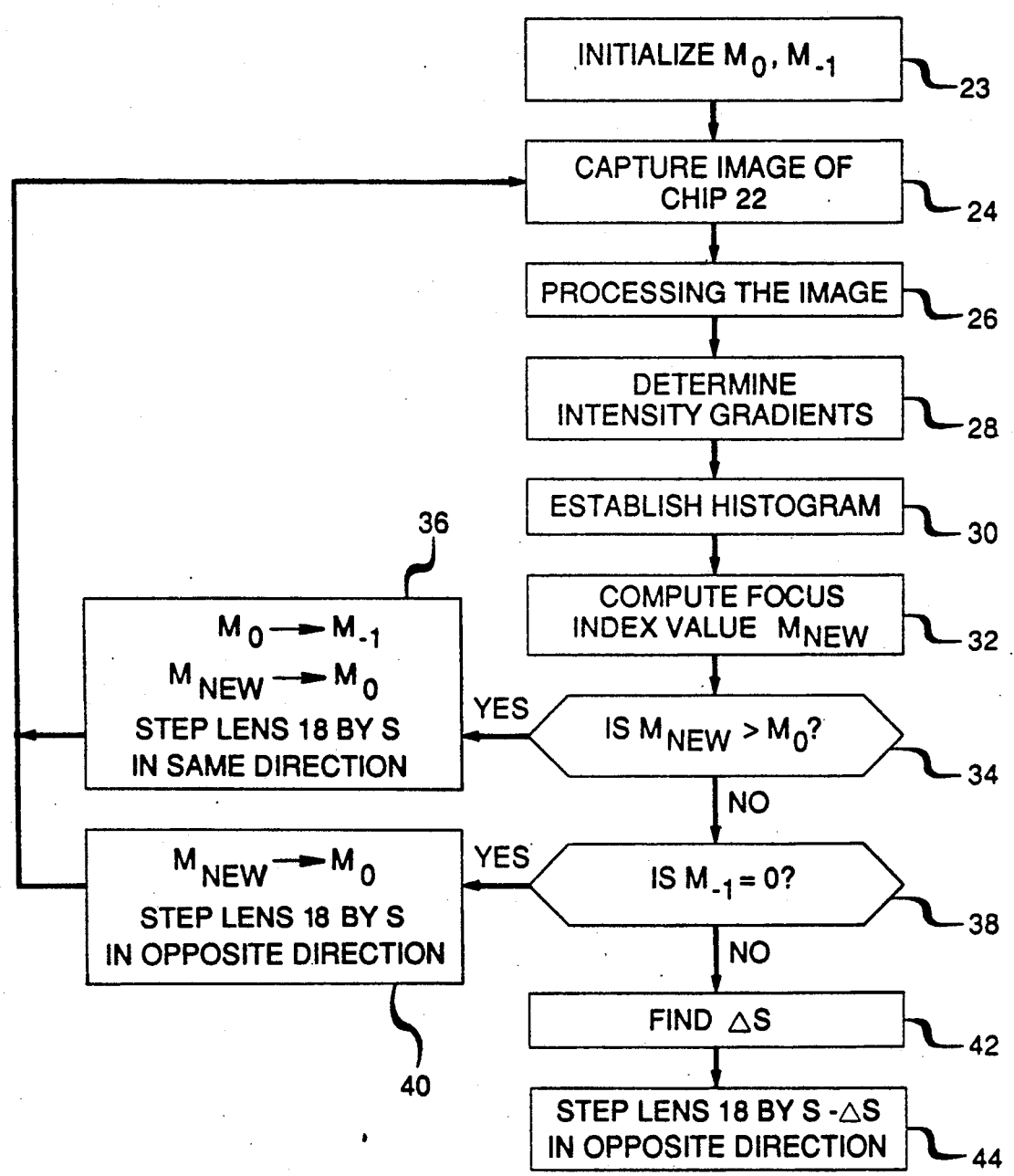
FIG. 2 is a flowchart representation of an autofocusing method in accordance with the invention.
Figure 3:
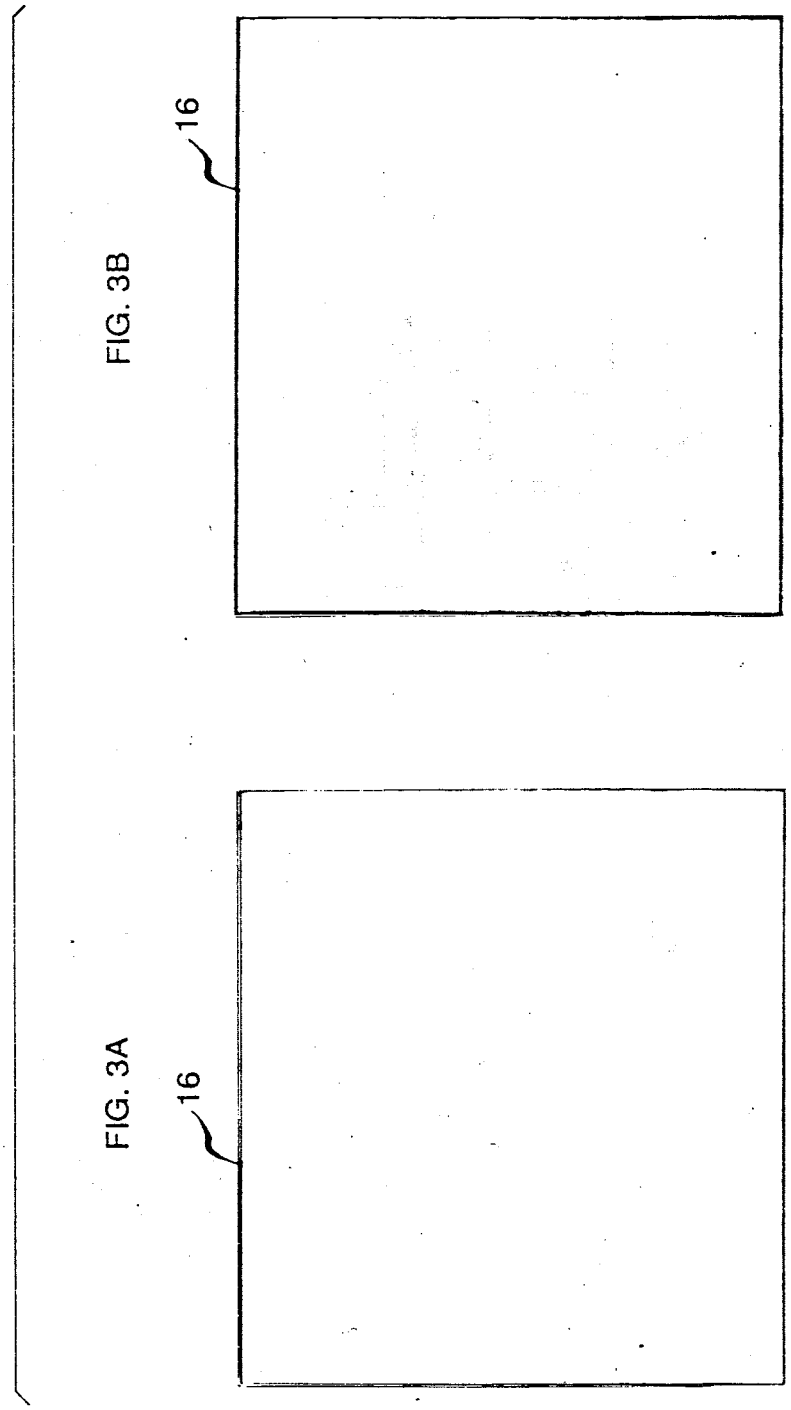
FIGS. 3A and 3B are photographic representations of the image of an article captured by an image-acquisition device of the apparatus of FIG. 1 for each of two separate focus adjustments.

Referring to FIG. 2, the first step (step 23) in the autofocusing method of the invention is to initialize a pair of variables $M_{-1}$ and $M_0$ to zero. The next step (step 24) is to capture the image of the chip 16 with the camera 12 of FIG. 1. Referring now to FIG. 3A, there is shown a photographic reproduction of the image of the chip 16 captured by the camera 12. To appreciate the operation of the autofocusing technique of the invention, it is assumed that the lens 18 on the camera is initially out of focus, and for this reason, the image of the chip 16 shown in FIG. 3A is blurred.

Referring to FIG. 2, following step 24, the captured image is then processed (step 26) by the machine vision processor 22 of FIG. 1 to establish the intensity of each of a plurality of small areas (pixels) within the image. The intensity is measured on a gray scale, typically 0-255, with 255 representing the highest possible intensity. For purposes of the invention, the machine vision processor 22 needs only to establish the intensity of the pixels in a small portion of the image captured by the television camera 12, rather than all the pixels in the image. Once the intensity of the pixels in the small portion of the image is established, then the gradient of the intensity within a small neighborhood about each pixel is established, using a well-known technique, such as the Sobel or Roberts method (step 28). If the intensity gradient at every pixel in the image of FIG. 3A were substituted for the pixel intensity, the resultant image would appear as seen in FIG. 4A. The image shown in FIG. 4A is usually referred to as a "gradient" image.

Figure 5A:
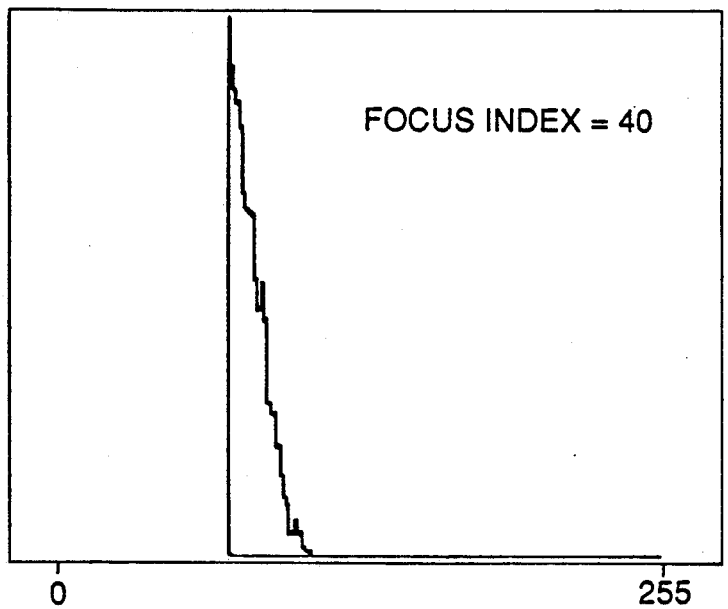
FIGS. 5A and 5B are photographic representations of the upper portion of the histogram of the gradient intensities of the images of FIGS. 3A and 3B, respectively.

Following step 28, a histogram, that is, a plot of the frequency or number of pixels having a particular intensity gradient value between 0 and 255 is then established (step 30) for the gradient image of FIG. 4A. Referring to FIG. 5A, there is shown the upper portion of the histogram of the pixel intensity gradients, showing N frequency values (where N is an integer, typically $\leq 35$), representing the pixels having an intensity exceeding a noise threshold of $N_0$ and lying within the range of $g_{max}$ and $g_{max}-h$, where $g_{max}$ is the maximum pixel intensity gradient $\leq 255$ and h is a fixed integer $\geq N$.

After step 30, step 32 is executed, whereupon a focus index value, $M_{new}$, is computed. The focus index value $M_{new}$ represents a measure of the sharpness of focus of the image captured during step 24. In practice, $M_{new}$ is computed in accordance with the formula:

$$M_{new} = \frac{A}{N} \sum_{g_{max}-h}^{g_{max}} g_i \quad (1)$$

where A is a constant, $g_i$ represents a successive one of N pixel gradient intensity values, each above a noise threshold $n_0$ and each lying in the range between $g_{max}$, the maximum pixel intensity gradient, and $g_{max}-h$, h being an integer greater than N. When computed in this fashion, $M_{new}$ will be inversely proportional to the degree of blur caused by the lens 18 being out of focus. Therefore, when $M_{new}$ is a maximum, the image captured by the camera 12 will be sharply focused.

Alternatively, the focus index $M_{new}$ can be computed using the formula:

$$M_{new} = \frac{B}{\sum_{g_{max}-h}^{g_{max}} n_i} \quad (2)$$

where B is a constant and $n_i$ is the pixel intensity frequency for each of N corresponding pixel intensity gradient $g_i$ having a value above a noise threshold $n_0$, and lying between $g_{max}-h$ and $g_{max}$. When the focus index value $M_{new}$ is computed in accordance with equation (2), it will be inversely proportional to the square of the degree of blur, and thus, when $M_{new}$ is a maximum, the captured image will be in sharp focus. In practice, it has been observed that equation (1) provides a more robust measure of the focus index value $M_{new}$ than equation (2).

Once the focus index $M_{new}$ is computed during step 32, either in accordance with equations (1) or (2), then the value of $M_{new}$ is compared to the value of $M_0$ during step 34. Initially, $M_0$ is zero so that $M_{new}$, which, in practice, is always non-zero, will be greater than $M_0$ during the initial execution of step 32. As a consequence, step 36 is then executed, whereupon the variable $M_{-1}$ is assigned the current value of $M_0$, which, as will be recalled, was initially set to zero. The variable $M_0$ is then set to the current value of $M_{new}$. Also during step 36, the lens 18 is "stepped", that is, the focus ring 20 of FIG. 1 is rotated through a small arc S in a first direction, (e.g., clockwise). The size of the "step" S determines the degree of change of the focus of the lens 18 when the lens is stepped.

Following step 36, the steps 24-34 are executed again, in the same manner as before. When step 34 is re-executed, the value of $M_{new}$, just computed during the subsequent execution of step 32, is compared to the current value of $M_0$, which has now been assigned the value of $M_{new}$ computed during the previous execution of step 32. In other words, during each subsequent execution of step 34, the focus index value $M_{new}$ obtained after incrementally stepping the lens 18 in the first direction by the step S is compared to the focus index value existing immediately prior to stepping the lens.

Figure 5B:
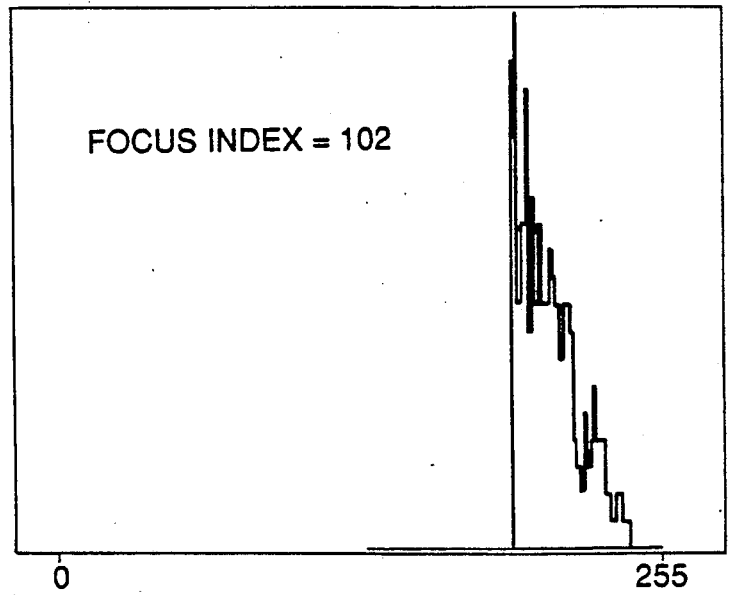

Whether the newly computed value of $M_{new}$ is greater or less than $M_0$ (the previously calculated focus index value) will depend on whether stepping of the lens 18 in the first direction causes the image captured during subsequent execution of step 24 to be more or less sharply focused. Assuming that after stepping of the lens 18, the captured image is more sharply focused, as seen in FIG. 3B, then the gradient image, of FIG. 3B, which is shown in FIG. 4B, will have higher gradient values. The histogram obtained from the pixel intensity gradients for the image of FIG. 3B, the upper portion of which histogram is seen in FIG. 5B, will have its peak shifted rightward, as compared to the histogram portion of FIG. 5A, indicating the image is now more sharply focused. Accordingly, the histogram portion shown in FIG. 5B will yield a larger focus index value $M_{new}$, as a direct consequence of equation 1.

When the lens 18 is stepped by an amount S in the first direction upon the initial execution of step 36, it is possible that the image may not become more sharply focused but, indeed, may become even more blurred. This is because the lens 18 is being stepped in the "wrong" direction. When the lens 18 has been initially stepped in the wrong direction following execution of step 36 for the first time, the subsequently obtained value of $M_{new}$ will be less that of $M_0$. When $M_{new}$ is less than $M_0$, then after step 34, step 38 rather than step 36 is executed. During step 38, the current value of the variable $M_{-1}$ is compared to zero. Since $M_{-1}$ had been set to the value of $M_0$ (zero) upon the initial execution of step 36, then $M_{-1}$ will be found equal to zero when step 38 is executed for the very first time. Under these conditions, step 40 is executed immediately following step 38. During execution of step 40, the variable $M_0$ is accorded the current value of $M_{new}$. Also, the direction in which the lens 18 is stepped is reversed before stepping the lens by an amount S. Since the lens 18 had initially been stepped clockwise, now the lens will be stepped counterclockwise each time step 36 is re-executed. Following step 40, there is a branch to step 24 which is re-executed, together with steps 26-34, in sequence.

The purpose in comparing the variable $M_{-1}$ to zero during step 38 is to detect whether the captured image becomes more blurred after the lens 18 is initially stepped by an amount S following the initial execution of step 36. Under these circumstances, the direction in which the lens 18 is stepped must be reversed, which is exactly the action that is taken during step 40. By stepping the lens 18 in the opposite direction as before, the captured image will become more sharply focused.

Figure 6:
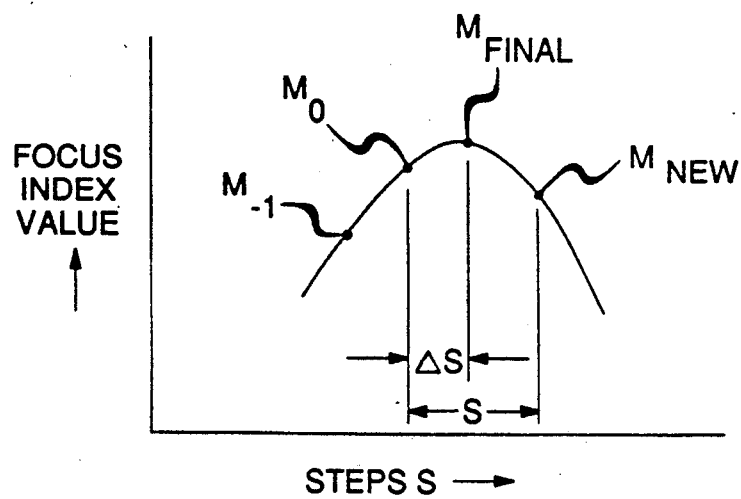
FIG. 6 is a plot of the focus index value versus relative movement of the article and the image-acquisition device determined during execution of the method of FIG. 2.

The steps 24-36 are repeatedly re-executed for as long as the newly computed value of $M_{new}$ exceeds the value of $M_0$, which, as will be recalled, is successively assigned the focus index value computed during the previous execution of step 32. Ultimately, after the lens 18 has been cumulatively stepped a certain amount, the captured image will no longer be more sharply focused than before the lens was stepped. Referring now to FIG. 6, there is shown the relationship between the focus index value $M_{new}$ versus S, the incremental step distance. The curve in FIG. 6 can be approximated by a second order polynomial, so that depending on the cumulative amount by which the lens is stepped, the focus index value $M_{new}$ obtained after the lens has been incrementally stepped may fall below the peak focus index value ($M_{final}$) on the curve.

Referring to FIG. 2, if, after the last iteration of executing steps 24-34, the value of $M_{new}$ is now less than $M_0$, then step 38 is executed as described previously. When step 38 is executed after steps 24-36 have been executed more than once, the value of $M_{-1}$ will no longer equal zero, but will now equal the third most recent value of $M_{new}$ which is invariably greater than zero.

When $M_{-1}$ is found to be greater than zero during step 38, then step 42, rather than step 40, is subsequently executed. During step 42, a step interval, $\Delta S$, is established in accordance with the relationship.

$$\Delta S = \frac{M_{new} - M_{-1}}{2[(M_0 - M_{-1}) + (M_0 - M_{new})]} \quad (3)$$

The quantity $\Delta S$ is a "signed" quantity in that it may have a positive or negative value. The difference between S and $\Delta S$ represents the absolute distance the lens 18 must be stepped in the opposite direction as before so the focus index value $M_{new}$ is at the peak value, $M_{final}$, assuring the sharpest possible focus.

Following computation of $\Delta S$ during step 42, the lens 18 is then stepped during step 44 by the amount $S - \Delta S$ in the opposite direction as before in order bring the captured image into the sharpest focus possible.

The step size S, that is, the degree to which the lens ring 20 on the lens 18 is rotated during each execution of steps 36 and 40, determines the accuracy and speed of the autofocusing technique of the invention. By making the step size S large, the number of iterations, that is the number of times steps 24-36 are repeated, will be less than if the step size is small. However, there will be some sacrifice in the focusing accuracy. Conversely, if the step size is small, the accuracy will be higher, yet more iterations will be required.

The foregoing describes a technique for achieving autofocusing of an image which relies on a histogram of the intensity gradients of each of a plurality of small areas (pixels) within the image to establish a measure of the sharpness of focus. The use of the histogram to establish the sharpness of focus renders the present technique more sensitive than prior art techniques which rely on the full range of pixel intensity gradient values and more robust than techniques which rely on a fixed intensity gradient. Moreover, the technique can be executed quite rapidly on present day machine vision systems since most machines have electronic circuitry for automatically calculating histograms. Alternatively, the focus index value calculation may be performed quite rapidly within a small area in the field of view of the camera 12, even using a general purpose computer.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for adjusting the focus of an image-acquisition device so that the image-acquisition device captures the image of an article in sharp focus, comprising the steps of:
    (a) establishing a current focus index value as having an initial value of zero;
    (b) capturing the image of at least a portion of an article with an image-acquisition device having adjustable focus;

(c) processing the image captured by the image-acquisition device to determine an intensity gradient for all of the small areas within the image;

(d) establishing a histogram of the gradient intensities of all the pixels in the image;

(e) establishing a new focus index value from the histogram of the pixel intensity gradients;

(f) comparing the current focus index value to the new focus index value to determine in which direction the focus of the image-acquisition device should be adjusted so that the captured image is more sharply focused, thereby increasing the focus-index value;

(g) substituting the new focus index value for the current focus index value;

(h) incrementally stepping the focus of the image-acquisition device in the direction expected to increase the focus index value;

(i) repeating the steps of (b)-(h) until the new focus index value no longer exceeds the current focus index value;

(j) adjusting the focus of the image-acquisition device in the opposite direction by a step amount established in accordance with the difference between the new and current focus index values so that the captured image is sharply focused.

2. The method according to claim 1 wherein the new focus index value is established in with the relationship $$\text{focus index value} = A/N \sum_{g_{max}-h}^{g_{max}} g_i \qquad (1)$$

where A is a constant, $g_i$ represents a successive one of N (N being an integer $\leq 35$) pixel gradient intensity values, each above a noise threshold $n_0$ and each lying in the range between $g_{max}$, the maximum pixel intensity gradient, and $g_{max}-h$, h being an integer greater than N.

3. The method according to claim 1 wherein the new focus index value is established in accordance with the relationship:

$$\text{focus index value} = \frac{B}{\sum_{g_{max}-h}^{g_{max}} n_i} \qquad (2)$$

where B is a constant, $g_i$ represents a successive one of N (N being an integer $\leq 35$) pixel gradient intensity values, each above a noise threshold $n_0$ and each lying in the range between $g_{max}$, the maximum pixel intensity gradient, and $g_{max}-h$, h being an integer greater than N.

4. The method according to claim 1 wherein the step amount by which the focus on the optics system is finally adjusted is given by the term $S - \Delta S$ where S is the incremental amount which the focus adjustment is normally stepped, and $\Delta S$ is a signed quantity given by $$\Delta S = \frac{M_{new} - M_{-1}}{2[(M_0 - M_{-1}) + (M_0 - M_{new})]} \qquad (3)$$

where $M_{new}$ is the most recently computed focus index value, $M_0$ is the second most recently computed focus index value, and $M_{-1}$ is the third most recently computed focus index value.

* * * * *